Figure 1:
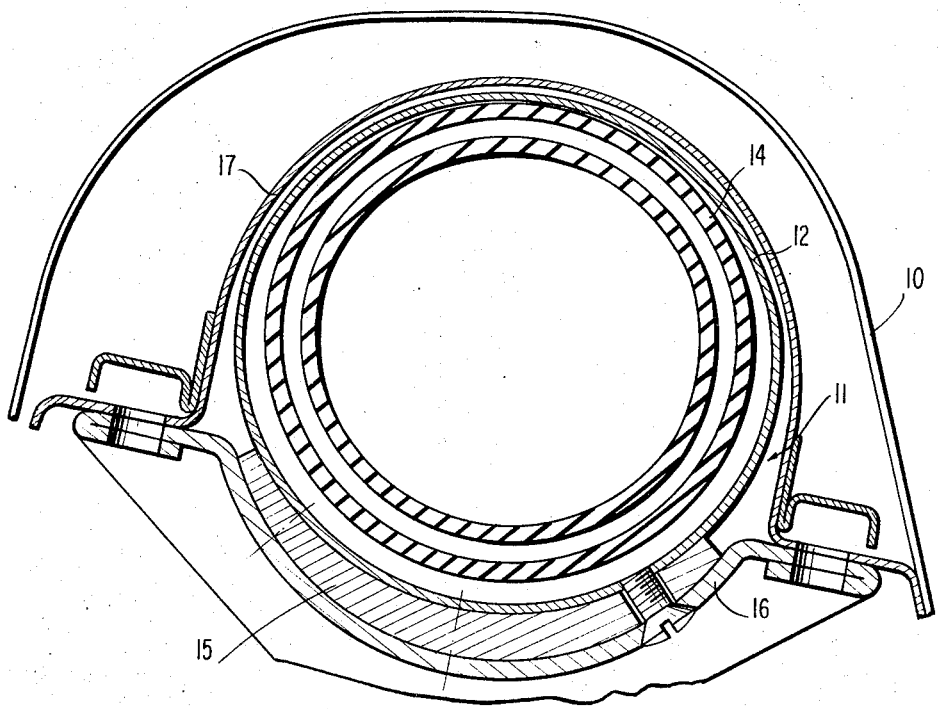

United States Patent
Beeskow

[15] 3,697,144
[45] Oct. 10, 1972

[54] INTERMEDIATE SUPPORT FOR THE UNIVERSAL JOINT SHAFT OF MOTOR VEHICLES

[72] Inventor: Bruno Beeskow, Bietigheim, Germany

[73] Assignee: Daimler-Benz Aktiengesellschaft, Stuttgart-Unterturkheim, Germany

[22] Filed: March 16, 1971

[21] Appl. No.: 124,845

[30] Foreign Application Priority Data

March 20, 1970 Germany..........P 20 13 305.5

[52] U.S. Cl.....................308/15, 308/26, 308/184 R
[51] Int. Cl.............................................F16c 35/00
[58] Field of Search......................308/15, 26, 184 R

[56] References Cited

UNITED STATES PATENTS 3,306,679  2/1967  Stokley..............308/184 R X
3,306,680  2/1967  Bruyere..............308/184 R X

*Primary Examiner*—Frederick L. Matteson
*Assistant Examiner*—Harry B. Ramey
*Attorney*—Craig, Antonelli, Stewart & Hill

[57] ABSTRACT

An intermediate mounting support for the universal joint shaft of motor vehicles that consists of an inner rigid part, accommodating the shaft bearing, of an outer rigid part secured at a fixed vehicle part and of an elastic ring body disposed between the same and consisting of rubber or the like whereby the inner part is eccentrically arranged with respect to the outer part and both the elastic ring body as well as the outer part have an approximately eliptical shape with the major axis thereof extending in the transverse direction; the outer rigid part is secured by means of an elastic spacer at a fixed vehicle part thereby providing an appropriate adjustability by selection of such spacer.

14 Claims, 2 Drawing Figures

PATENTED OCT 10 1972 3,697,144

INVENTOR
BRUNO BEESKOW

BY Craig, Antonelli, Stewart & Hill
ATTORNEYS

INTERMEDIATE SUPPORT FOR THE UNIVERSAL JOINT SHAFT OF MOTOR VEHICLES

The present invention relates to an intermediate bearing support for the universal joint or cardan shaft of motor vehicles, consisting of an inner rigid part accommodating the shaft bearing, of an outer rigid part secured at a fixed vehicle part and of an elastic annular body disposed therebetween and made, for example, of rubber or the like.

In motor vehicles, the universal joint shafts are frequently supported by an intermediate bearing support of the aforementioned type within the cardan tunnel or at another fixed vehicle part. Care must be taken in connection with this support that the vibrations of the universal joint shaft remain as small as possible or involve only predetermined frequency ranges because otherwise an annoyance occurs as a result of noises or vibrations.

The present invention is concerned with a solution of this problem as its primary task. The underlying problems are solved with the aforementioned intermediate bearing supports in accordance with the present invention in that the inner rigid part is arranged eccentrically with respect to the outer rigid part and the elastic annular body as well as the outer rigid part are constructed as eliptical parts extending in the transverse direction, and in that the outer rigid part is adjustably secured at the fixed vehicle part by means of elastic spacer means.

The intermediate bearing support according to the present invention offers the advantage that the bearing support center is displaced and therewith a reduction of the knee angle of the universal joint shaft can be attained. As a result thereof, no disturbing vibrations occur any longer and the cardan shaft runs completely quietly and smoothly. Additionally, the advantage is achieved thereby that this support can be adapted also to other types of vehicles by exchanging the elastic spacer.

Rings of metal or synthetic resinous material of any suitable type may be used as rigid parts. The elastic annular body is connected with these rigid parts by gluing, adhesion or in any other conventional manner. Approximately, the inner rigid part is thereby provided with a one-sided collar so that the shaft bearing can be inserted from one side into the inner rigid part up to abutment at this collar.

In one embodiment according to the present invention, the inner rigid part is offset in the upward direction with respect to the center of the outer rigid part and the latter is threadably secured in the lower area thereof at a cross traverse, girder, or the like within the cardan tunnel by means of an exchangeable spacer segment. The spacer segment may thereby have an essentially sickle-shaped configuration.

The annular body of the intermediate bearing support of the present invention may, as seen in cross section, have a V-fold. This V-fold is matched to the eliptical shape of the mounting i.e., the V-opening becomes narrower or wider corresponding to the eliptical shape. A further feature of the present invention resides in the fact that the outer rigid part is surrounded with play in the upper area by a fixed vehicle part, for example, by an arcuately shaped traverse. The adjustability of the bearing support is not influenced or impaired by the predetermined play. However, in case of defects an emergency support of the universal joint shaft can be achieved thereby and excessive vibrational deflections can be precluded in a temporary, makeshift manner.

Accordingly, it is an object of the present invention to provide an intermediate bearing support for universal joint shafts of motor vehicles which avoids by simple means the aforementioned shortcomings and drawbacks encountered in the prior art.

Another object of the present invention resides in an intermediate mounting support for the universal shafts of motor vehicles which assures a minimum of annoyances as a result of noises or vibrations that may occur in the universal joint shaft.

A further object of the present invention resides in an intermediate support for the universal joint shaft of motor vehicles which minimizes disturbing vibrations, is simple in construction and can be readily assembled or disassembled in case of need.

A further object of the present invention resides in an intermediate mounting support for the universal joint shaft of motor vehicles which precludes the occurrence of disturbing vibrations and assures a completely quiet running of the shaft.

Still a further object of the present invention resides in an intermediate bearing support for the universal joint shafts of the type described above which can be matched to all types of vehicles and permits an easy assembly as well as makeshift repair in case of any breakdowns or defects.

Figure 2:
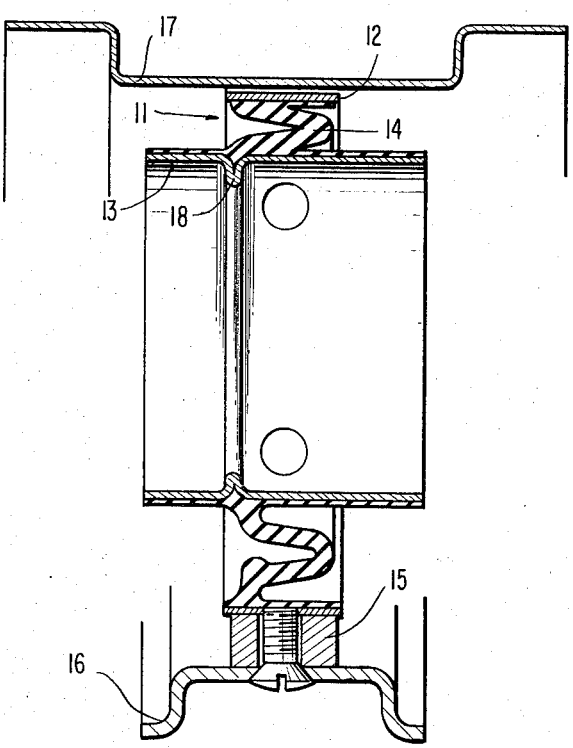

These and further objects, features and advantages of the present invention will become more obvious from the following description when taken in connection with the accompanying drawing which shows, for purposes of illustration only, one embodiment in accordance with the present invention, and wherein:

FIG. 1 is a transverse cross-sectional view through an intermediate bearing support for a universal joint shaft in accordance with the present invention; and FIG. 2 is a partial longitudinal cross-sectional view through the intermediate bearing support of FIG. 1.

Referring now to the drawing wherein like reference numerals are used throughout the two views to designated like parts, according to FIGS. 1 and 2, a universal joint shaft (not shown) is supported in the cardan tunnel 10 by means of an intermediate mounting support generally designated by reference numeral 11. The intermediate mounting support 11 consists of an outer metal ring 12, of an inner metal sleeve 13 and of an elastic body 14 disposed therebetween. The elastic body 14, made, for example, from rubber, is adhesively connected in a conventional manner with the two parts 12 and 13.

The inner metal sleeve 13 is offset in the upward direction with respect to the outer metal ring 12. Both the elastic ring 14 as also the outer metal ring 12 have an approximately eliptical shape whereby the major axis thereof extends in the transverse direction as seen in FIG. 1. The elastic body 14 (FIG. 2) is folded V-shaped in cross section whereby this fold becomes narrower or wider corresponding to the eliptical shape.

The outer metal rings 12 is threadably secured to a cross traverse 16 by the interposition of an elastic spacer or shim 15. The spacer 15 is interchangeable so that the center of the bearing support can be changed in this manner within the cardan tunnel 10. Furthermore, the knee angle or bending angle of the joint shaft is reduced already by the eccentricity of the inner metal sleeve 13; in other words, the joint shaft sags less. The outer metal ring 12 is surrounded with play also in the upper area by an arcuately shaped traverse 17. In this manner, with the exchange of the spacer 15, the mounting support 11 can be displaced within a certain range in the upward or downward direction.

The inner metal sleeve 13 is provided with an inwardly drawn collar 18 (FIG. 2) which serves as abutment for the shaft bearing (not shown) that is laterally inserted into the sleeve 13 up to abutment at this collar 18.

While I have shown and described only one embodiment in accordance with the present invention, it is understood that the same is not limited thereto, but is susceptible of numerous changes and modifications as known to those skilled in the art, and I therefore do not wish to be limited to the details shown and described herein, but intend to cover all such changes and modifications as are encompassed by the scope of the appended claims.

I claim:

1. An intermediate bearing support for the universal joint shaft of motor vehicles, which includes an inner rigid member adapted to accommodate a shaft bearing, an outer rigid member secured at a fixed vehicle part and an elastic annular body means disposed therebetween, characterized in that the inner member is arranged eccentrically with respect to the outer member and in that the elastic body means as well as the outer member are constructed as approximately eliptical parts extending in the transverse direction, and in that the outer member is secured at the fixed vehicle part by elastic spacer means.

2. An intermediate bearing support according to claim 1, characterized in that said outer member is adjustably secured at the respective fixed vehicle part by said elastic spacer means which can be interchanged and thus forms in effect an adjustable spacer.

3. An intermediate bearing support according to claim 2, characterized in that the inner member is offset in the upward direction with respect to the center of the outer member, and in that the outer member is threadably secured by said spacer means at the cardan tunnel.

4. An intermediate bearing support according to claim 3, characterized in that said outer member is secured at the cardan tunnel by way of a cross traverse.

5. An intermediate bearing support according to claim 4, characterized in that said elastic body means has a V-fold as viewed in cross section.

6. An intermediate bearing support according to claim 5, characterized in that the outer metal member is surrounded with play in the upper area by a fixed vehicle part.

7. An intermediate bearing support according to claim 6, characterized in that said last-mentioned fixed vehicle part is an arcuately shaped traverse.

8. An intermediate bearing support according to claim 7, characterized in that said elastic body means essentially consists of rubber.

9. An intermediate bearing support according to claim 1, characterized in that the inner member is offset in the upward direction with respect to the center of the outer member, and in that the outer member is threadably secured by said spacer means at the cardan tunnel.

10. An intermediate bearing support according to claim 9, characterized in that said outer member is secured at the cardan tunnel by way of a cross traverse.

11. An intermediate bearing support according to claim 1, characterized in that said elastic body means has a V-fold as viewed in cross section.

12. An intermediate bearing support according to claim 1, characterized in that the outer metal member is surrounded with play in the upper area by a fixed vehicle part.

13. An intermediate bearing support according to claim 12, characterized in that said last-mentioned fixed vehicle part is an arcuately shaped traverse.

14. An intermediate bearing support according to claim 1, characterized in that said elastic body means essentially consists of rubber adhesively connected with the inner and outer members.

* * * * *